July 12, 1938.  M. G. BIBERTHALER ET AL  2,123,327
STRAINER
Filed Jan. 6, 1937
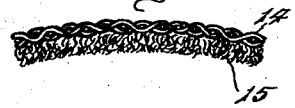
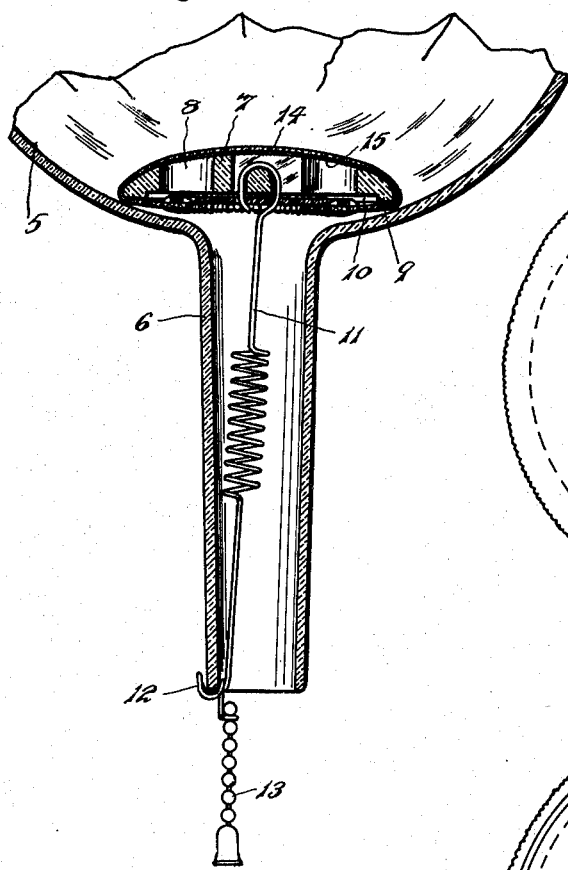
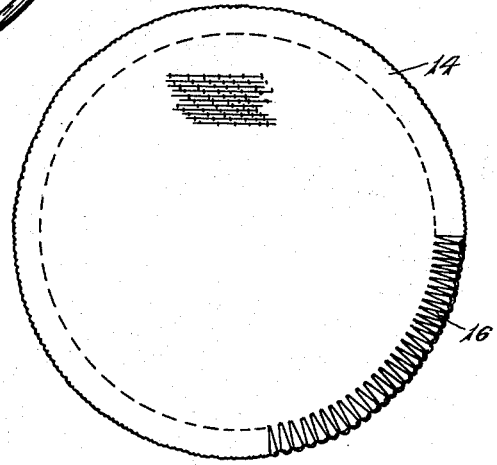
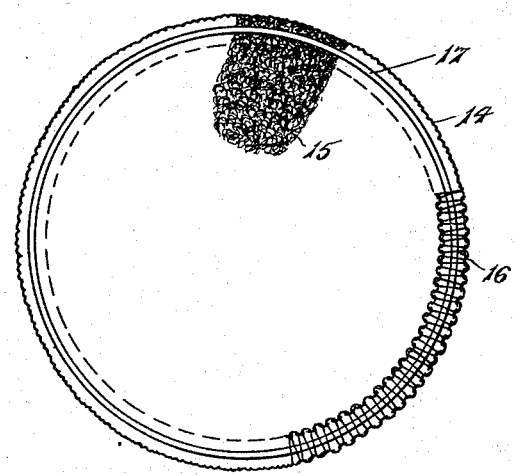
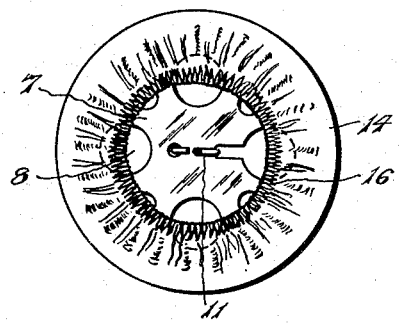
INVENTORS
MAX G. BIBERTHALER:
WESLEY R. BECHER:
BY *Louis V. Lucia*
ATTORNEY Patented July 12, 1938

2,123,327

UNITED STATES PATENT OFFICE 2,123,327

STRAINER

Max G. Biberthaler, Meriden, and Wesley R. Becher, Wethersfield, Conn., assignors to The Silex Company, Hartford, Conn., a corporation of Connecticut Application January 6, 1937, Serial No. 119,254

6 Claims. (Cl. 210—162)

Our invention relates to strainers and particularly to that type of strainers which are used in connection with coffee makers of the vacuum type. Such coffee makers usually comprise a lower and an upper bowl; the said upper bowl being mounted upon the lower bowl and having a stem extending thereinto.

In the use of said coffee makers, water is first placed in the lower bowl. Upon heating, the said water will be forced into the upper bowl where it is infused with coffee grounds therein. The supply of heat to said coffee maker is then shut off; whereupon, the cooling of the lower bowl creates a vacuum therein drawing infused water, now coffee, from the upper bowl back into the lower bowl.

A strainer is usually located in the upper bowl, directly over the opening in the stem thereof, for the purpose of straining the coffee grounds and retaining them in the upper bowl when the finished coffee is drawn back into the lower bowl. Such strainers consist of a sheet of cloth of a suitable kind, such as flannel, which is supported over a drainer in the form of a disc or plate; the edges of said strainer being drawn under the edges of said plate in order to secure the strainer thereto.

Our improved strainer is provided with a suitable elastic member which may be of any well known type, such as an elastic strip consisting of elastic threads contained within a braided covering, or a common rubber band as illustrated in the embodiment of our invention, for drawing the edges of said strainer sheet inwardly and thereby provide means for quickly and easily attaching said strainers to the said drain plate or other means which may be used to support the strainer in a coffee maker.

As the edges of the cloth sheet, from which said strainers are made have a tendency to unravel, it is highly desirable that the said sheet be provided along its edges with a row of stitches of a type well known as "over-edge" stitches, so as to prevent unraveling of the cloth material.

Since the said strainers become quickly soiled and therefore have to be replaced frequently, it is very important that they be produced in the most economical manner possible.

An object of this invention, therefore, is to provide a strainer, of the class above described, which comprises an elastic member that is secured adjacent to the edge of the cloth sheet by means of the said over-edge stitches; thus utilizing the said stitches for the purpose of preventing the material of the strainer sheet from unraveling as well as for securing the said elastic member thereto and thereby providing a highly efficient strainer in the most economical manner.

A further object of our invention is to secure said elastic member adjacent to the edge of the strainer sheet without requiring that the said edge be folded over the elastic member so as to avoid the said edge being bulky when drawn under the strainer plate.

Further objects will be readily understood from the following description and from the accompanying drawing in which:—

Figure 1 is a view in central vertical section showing our improved strainer as applied to a coffee maker.

Figure 2 is a bottom view, in elevation, of the said strainer showing the retaining member thereof broken away.

Figure 3 is a view, in cross section on an enlarged scale, of a portion of the material from which said strainer is constructed.

Figure 4 is a plan view, in elevation, showing the said strainer in its extreme opened form.

Figure 5 is the bottom view thereof.

As illustrated in the drawing, the numeral 5 illustrates a portion of a coffee maker bowl having a stem 6 depending therefrom. The numeral 7 denotes a drain, or plate, preferably convex in form and having a plurality of apertures 8 extending therethrough. The said plate is preferably provided with a depending flange 9 forming a recess 10 in the bottom thereof.

A retaining member 11, preferably in the form of a spring, is secured to said plate in a suitable manner and is provided with a hook 12 which may be pulled downwardly and hooked over the bottom edge of the stem 6, by means of a pull-chain 13, to firmly retain the said plate in engagement with the bottom of the bowl 5 as clearly illustrated in Figure 1 of the drawing.

Our improved strainer is cut in the form of a disc from a sheet of cloth 14 which is preferably of a flannel material having a wooly surface 15 at one side thereof that is particularly adapted for such strainers for the reasons hereinafter pointed out.

The said disc is usually provided with a row of stitches 16, commonly known as over-edge stitches, which extends along the entire edge of said disc to prevent unraveling of the cloth material.

Our invention consists of securing an elastic member 17, preferably in the form of an endless rubber band, adjacent to the edge of the disc by means of the said "over-edge" stitches and during the stitching operation; thus securing the said elastic member upon the bottom surface of the disc at the same time that the stitching is applied to prevent unraveling of the material and thereby rendering it possible to produce the strainer with maximum economy.

The said elastic member is stretched as it is being sewn on to the strainer disc so that, upon the same being released and permitted to assume its normal form, it will contract and draw the edges of the disc inwardly into a position overlapping the central portion of said disc; thereby forming the same into the shape of a pouch.

It will be understood that the said strainer may then be readily applied to the drain plate 7 by simply stretching apart the edges thereof and inserting the said plate thereinto. Upon being released, the strainer will assume its normal form in which the edges thereof are drawn, by the elastic member, towards the center of the drain plate; thus stretching the said strainer properly in position over the plate as clearly illustrated in Figures 1 and 2, of the drawing.

When the said plate, with the strainer thereon, is mounted within the coffee maker bowl, as in the position illustrated in Figure 1, and pulled into position by the retaining member 11, the said strainer will be clamped between the edges of the plate and the bottom of the bowl and thus be more firmly retained in operating position.

It will be noted that the wooly side of the flannel is on the inside of the strainer so that it lies in contact with the drain plate 7. This tends to separate the layer of woven cloth from the plate and thereby permit the coffee to more readily filter through the strainer.

While we have described the embodiment of our invention, as illustrated in the accompanying drawing, it is to be understood that the same may be modified to a lesser or a greater extent and that various other well known forms or types of suitable elastic members, such as elastic bands or strips, may be used in lieu of that herein described without departing from the scope of the appended claims. If desired, the said elastic member may be an elastic band of common form and consisting of elastic strands which are contained within a flexible covering.

We claim:

1. A strainer for coffee makers comprising a disc of cloth material, elastic means adjacent the edge thereof and extending substantially around said disc, and a series of over-edge stitches extending substantially around the said edge and in contact with said elastic means for securing the said means to said sheet whereby the said means will normally draw the said edge towards the center of said disc.

2. A strainer for coffee makers comprising a sheet of flexible material, means comprising an elastic member adjacent to the edge of said sheet and a series of over-edge stitches overlying the said means and in contact therewith for securing the same to said sheet; the said elastic means and stitches extending substantially around the periphery of said sheet for normally drawing the edges thereof inwardly thereon.

3. A strainer of the character described comprising a sheet of cloth material, means comprising an elastic member adjacent to the edges of said sheet and a series of stitches enclosing the said edges and overlying the said means in contact therewith for securing said means to said sheet; the said elastic means and stitches extending substantially around the periphery of said sheet for normally drawing its edges towards the center thereof.

4. A strainer of the character described formed from a disc of cloth material; the surrounding edge portions of said disc comprising a single thickness of said material, an elastic member adjacent the edge of said disc secured thereto solely by a series of over-edge stitches overlying the said member and the said edge; the said elastic member and stitches extending substantially around the said edge whereby the same is normally drawn inwardly towards the center of said disc.

5. The method of making a strainer of the character described from a disc of cloth material which consists of applying a stretched elastic member adjacent the free edge of said disc and securing said member to said disc solely by stitches overlying the said member and edge whereby, upon being released, the said edge is drawn towards the center of said disc.

6. A strainer of the character described comprising a disc of cloth material having an endless elastic band sewn adjacent to and along the edges of said disc by means of a row of over-edge stitches which are in contact with the said band and overlie the edge of said disc.

MAX G. BIBERTHALER.
WESLEY R. BECHER.